United States Patent [19]
Morse

[11] 3,904,393
[45] Sept. 9, 1975

[54] VENTURI-TYPE WATER AERATOR

[76] Inventor: Raymond A. Morse, Rt. 1, Box 229, Ore City, Tex. 75683

[22] Filed: July 13, 1973

[21] Appl. No.: 378,895

[52] U.S. Cl. ............... 55/228; 55/250; 55/505; 210/169; 261/4; 261/37; 261/121 M; 261/DIG. 75
[51] Int. Cl............................................. B01f 3/04
[58] Field of Search...... 261/4, 37, 121 M, DIG. 75; 210/169; 55/228, 250, 385, 505

[56] References Cited
UNITED STATES PATENTS

| | | | |
|---|---|---|---|
| 950,999 | 3/1910 | Erlwein et al.................. | 210/169 X |
| 2,261,830 | 11/1941 | Ditner........................ | 261/121 M X |
| 2,295,982 | 9/1942 | Widman....................... | 210/169 X |
| 2,533,936 | 12/1950 | Holmes et al. ............... | 261/121 M X |
| 2,865,618 | 12/1958 | Abell......................... | 261/121 M X |
| 3,640,516 | 2/1972 | Willinger..................... | 261/121 M X |

Primary Examiner—Frank W. Lutter
Assistant Examiner—William Cuchlinski, Jr.
Attorney, Agent, or Firm—Clarence A. O'Brien; Harvey B. Jacobson

[57] ABSTRACT

A filtering-type aerator for use in a live box, a minnow bucket, lobster tank, fish aquarium or the like characterized by a centrifugal pump unit, a companion base unit having enclosed water intercepting and filtering means, a complemental venturi-type fitting having one end communicatively united with the pump unit and its other end terminating in an aerated water discharging nozzle, and, in addition, atmospheric air intake and filtering means having an upstanding air delivering tube whose lower end is communicatively joined with an air inlet orifice or port which is lined up with the coordinating venturi restriction, whereby the drawn-in air is entrained in the propelled water stream emitted by the water oxygenating nozzle.

4 Claims, 3 Drawing Figures

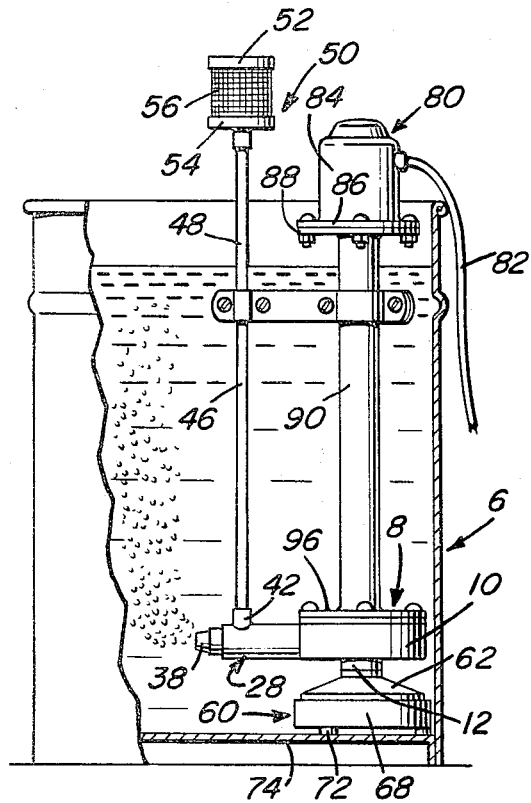
Fig. 1
Fig. 2
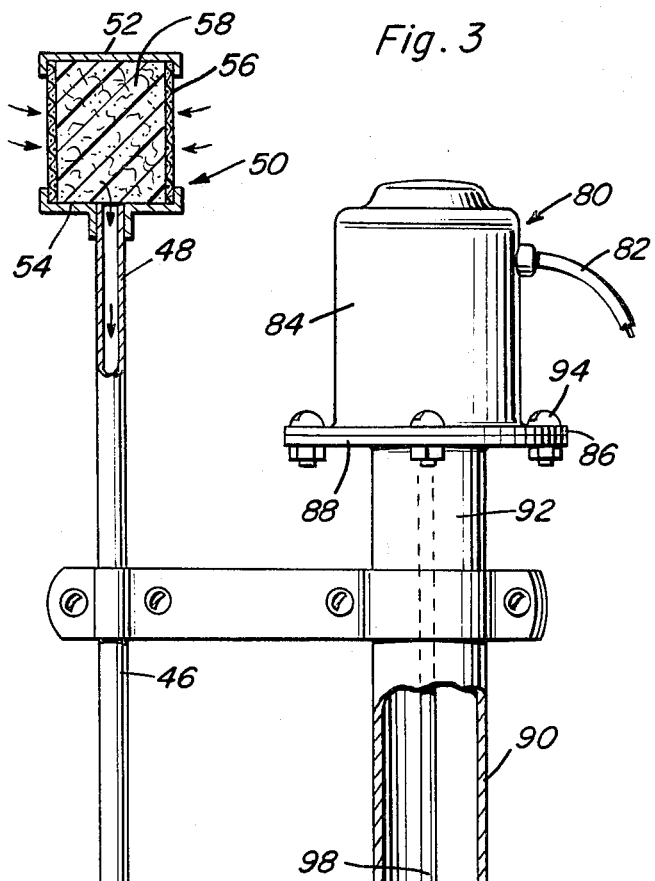
Fig. 3

VENTURI-TYPE WATER AERATOR

This invention relates to a novel aerator which is such in design, construction and adaptability that it lends itself to insertable self-supporting use in a minnow bucket, a live box, a lobster tank, an aquarium or the like and, when properly installed, oxygenates the confined water and in a manner to keep the fish or other creatures alive.

For background information it should be pointed out, at the outset, that water conditioning and aerating devices are of many and varying types and with this aspect of the matter in view certain broadly pertinent prior patents will be worthy of studied evaluation. One prior art patent is U.S. Pat. No. 3,146,195 granted to Martin J. Berardi and which has to do with water purification and conditioning means for a lobster tank. Secondly, the filtering and aerating means for fish tanks disclosed in U.S. Pat. No. 3,149,608 and granted to Clarence J. Murphy is thought to be indicative of the state of the art to which the invention relates. Then, too, and because it appears to be structurally and functionally pertinent attention may be accorded U.S. Pat. No. 950,999 granted to George Erlwein et al.

An object of the present invention, generally stated, is to improve upon and reduce the number of component parts entering into the combination, thereby not only increasing the efficiency of the device as a whole, but also rendering the same less costly to manufacture and to otherwise simplify factors of assembling and sale particularly in that the principal parts are susceptible of being made of moldable plastic materials.

Another aspect of the overall concept has to do with the fact that the component parts which have been devised and coordinated make it practical and possible to produce an adaptation which may be made small enough for practical use in live boxes and minnow boxes and yet amply and sufficiently large for satisfactory and acceptable use in containers and tanks currently in use on transport trucks while the fish or other confined creatures are in transit.

Briefly the aerator is characterized by a centrifugal pump unit having a depending axial water inlet neck and a complemental peripheral water discharge neck. The inlet neck is aligned and communicatively connected with a cooperating neck on an upper central portion of the shell of a self-standing and supporting base. The base is provided with water filtering means coacting with the bladed impeller in the pump housing. A fitting of suitable construction is employed and connected with the discharge neck of the pump and is provided with a venturi-type passage. This fitting constitutes a satisfactory adapter and is provided at its discharge end with an aerated water nozzle. The adapter fitting has an orifice in line with the restricted median portion of the passage which functions to introduce atmospheric and filtered air into the stream to achieve the desired oxygenating result. The prime mover for the pump is elevated to assume the desired level and, in addition, a vertically elongated air delivering tube communicates at its lower end with the air inlet orifice of the adapter and is provided at its upper end with an elevated atmospheric air filter.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a view showing a venturi-type water aerator constructed in accordance with the principles of the invention and wherein it is appropriated for use in a container which may be construed either as a minnow bucket, tank or other container.

FIG. 2 is an enlarged plan view of the aerator by itself.

FIG. 3 is an enlarged view with parts in section and elevation taken approximately on the plane of the section line 3—3 of FIG. 2 looking in the direction of the indicating arrows.

Referring now to the views of the drawing and with reference again to FIG. 1 the bucket or other container is denoted by the numeral 6. It will be understood that the expression "container" is intended to comprehend a live box, a minnow bucket, a lobster tank, a fish or equivalent aquarium or the like.

The aforementioned centrifugal pump unit is denoted by the numeral 8 and embodies a cup-like rim-equipped receiver 10, the central bottom portion of which is provided with an axial depending assembling neck 12. The disk-like or equivalent cover section 14 is suitably constructed and marginally mounted atop the rim and secured thereto by appropriate headed screw-threaded fasteners 16. This cover is shown provided with an upstanding neck-like extension which constitutes a bearing 18 and whose bore is lined with an appropriate bushing 20. These component parts provide a housing for the bladed rotor 22 having, as usual, an axial hub 24 in line with the aforementioned neck 12. As brought out in FIG. 2 one peripheral side of the housing is provided with a water discharge neck 26. Further consideration of FIG. 2 will show that the aforementioned fitting is such in construction that it provides an appropriate adapter 28. One end portion of the adapter 30 is communicatively mounted on the cooperating end of the pump discharge neck 26. As brought out in FIG. 3 the axial passage through the adapter is denoted at 32, the restricted median portion being designated at 34. The reduced terminal end portion 36 is provided with an attachable and detachable aerated water discharge nozzle or nipple 38. The adapter is also provided with an air inlet orifice 40 lined up with an upstanding connector 42. This connector serves to accommodate the lower end portion 44 of a vertically elongated air delivering tube 46. The upper end portion 48 of this tube or conduit elevates and supports an appropriate atmospheric air filtering unit which is denoted generally stated by the numeral 50. It comprises upper and lower caps 52 and 54 connected with an intervening screen 56, said screen encompassing and confining the air filtering filler or core 58.

Reverting now to the aforementioned self-standing stand-type base unit this is denoted, generally stated, by the numeral 60 and as brought out particularly well in FIG. 3 it comprises a conical shell or body 62 having a depending externally screw-threaded rim 64. The axial truncated portion of the shell is provided with an upstanding assembling neck 66 which is telescopingly connected with the aforementioned assembling neck 12 thus connecting the two component parts, the pump unit and base unit in appropriately assembled relationship. The screw-threaded rim serves to accommodate an internally screw-threaded flange or rim 68 carried by a ledge-like annulus 70. This annulus is provided on its underneath side with appropriate anti-skid buttons or feet 72 which rest on the bottom 74 of the aforementioned container 6 as brought out in FIG. 1. These interconnected component parts serve to accommodate a ledge supported screen 76 and an associated filtering insert 78. Thus water from the tank entering the pump must pass through the screen 76 and the filtering media 78 prior to its entry into the pump housing. Once in the pump housing and with the impeller rotating the stream of water is centrifugally fed through the discharge neck 26 and into the venturi adapter 28 in a manner obvious, it is believed, from the views of the drawing. It follows that atmospheric air having been filtered by way of the filtering head 50 enters the venturi restriction by way of the orifice 40 and the intervening delivery tube or conduit 44. The air entrained in the discharging stream of water is mixed therewith and is forcibly discharged into the tank water by way of the aforementioned nozzle 38. For purposes of delivering power to the pump an elevated prime mover is employed. The prime mover shown is a simple well known type of electric motor which is denoted at 80, the same provided with a current conductor 82. The casing of the motor, that is the casing 84 is provided at its bottom with a horizontal outstanding flange 86 which serves to accommodate a similar mating flange 88 on the upper end of a vertically elongated sleeve 90. The upper flanged end is denoted at 92 and suitable fasteners 94 serve to join the coacting flanges 86 and 88. A similar outstanding and encompassing flange is provided at 96 in FIG. 3 and surrounds the aforementioned bearing 18 and rests atop the cover section and is fastened thereto in the manner shown particularly well in FIG. 3. The impeller driving shaft is denoted by the numeral 98 and has its upper end operatively joined with the motor (not detailed), the lower end portion 100 having its terminal end 102 passing down through the bushing and keyed to the aforementioned rotor hub 24.

It follows that power is delivered by way of the drive shaft 98 to the rotor causing the same to function as usual in a centrifugal type pump. The water to be aerated is drawn into the housing of the pump by way of the screened base unit and is forcibly delivered by way of the discharge neck into the aforementioned venturi-type adapter.

As before touched upon the invention may be relatively small and of a portable type and capable of use in correspondingly small live boxes and minnow buckets. On the other hand the device may be amply large to adapt the same for commercial installation use. Care has been taken in adopting and designing the parts that they are capable of being made from moldable plastic materials, for the most part, whereby to appeal to manufacturers, retailers and purchasers alike. A small type aerator such as illustrated and as experience has shown will weigh only a matter of a few pounds and also, as experience has shown, a 12 volt motor can be used to function in the manner described. Then, too, the invention may be made in a relatively large size to adapt it to practical use in a transport truck and in a manner to keep fish alive while in transit. In fact experience has shown that the prime mover can be operated from a vehicle battery or a small gasoline engine.

It will be observed that the self-standing base unit acts as a support for the entire device when placed in a vat. Emphasis is also placed on the adoption and use of atmospheric air filtering means and the delivery tube which has been found to be highly satisfactory in that it functions to prevent poisonous insects and foreign matter from being drawn into the water. These and other features and advantages of the invention are thought to be clear from the views of the accompanying drawing. Accordingly, a more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. For environmental life promoting use in a water-filled live box, a minnow bucket, lobster tank, aquarium, or the like; a filtering-type aerator comprising, a centrifugal pump unit embodying a housing having a depending axial water inlet neck and a complemental peripheral water discharge neck, a rotatable bladed impeller operably confined in said housing and provided with a centralized driven hub, a self-standing base unit for said pump unit aligned with and cooperatively located in a plane below the plane of said housing, said base unit embodying a hollow casing having a water intake provided with oriented filtering media and also having an axial upstanding neck communicatively coupled to said water inlet neck, an electric motor embodying a vertical casing having an outstanding endless bottom flange, a vertically elongated drive shaft having its upper end connected to and operated by said motor and having a lower end aligned with and connected to said hub, said pump housing having an upstanding bearing lined with a bushing, the lower end of said shaft being journaled for rotation in said bushing, a vertically elongated motor elevating and supporting sleeve surrounding and protectively enclosing said shaft, said sleeve interposed between said motor casing and pump housing and having an upper end provided with an outstanding first flange oriented with, abutting and separably fastened to the aforementioned bottom flange and also having a second flange at a lower end superimposed upon and separably fastened atop said pump housing, a fitting constituting a venturi-type adapter and having one end communicatively connected to the aforementioned peripheral discharge neck and provided with an aerated water discharging nipple at its other end, said adapter fitting having an open-ended passage with a median venturi restriction provided with a coordinating air inlet orifice, and atmospheric air filtering water aerating means having a vertically elongated air delivering tube communicatively joined with said air inlet orifice whereby air descending said tube is picked up, entrained and mixed with the pressurized stream of water prior to being discharged by way of said nipple.

2. The aerator defined in claim 1, and wherein said base unit embodies a hollow conical shell having a connector-neck telescopingly joined to said water inlet neck, said shell provided with a depending externally threaded rim, an annulus provided with an internally screw-threaded upstanding rim screwed to said depending rim and having a bottom surface provided with supporting feet, said annulus provided with a screen supporting and operatively positioning said filtering media, the latter comprising a porous pad aligned with, seated atop, and supported by said screen.

3. The aerator defined in and according to claim 2, and wherein said delivering tube is of predetermined height and has an upper end provided with a screen-enclosed atmospheric air intake filter.

4. For environmental life promoting use in a water-filled live box, a minnow bucket, lobster tank, aquarium, or the like; a filtering-type aerator comprising, a centrifugal pump unit embodying a housing having a depending axial water inlet neck and a complemental tangential peripheral water discharge neck, a rotatable bladed impeller operably confined in said housing and provided with a centralized driven hub, a self-standing base unit for said pump unit aligned with and cooperatively located in a plane below the plane of said housing, said base unit embodying a hollow casing having a water intake provided with oriented filtering media and also having an axial upstanding neck communicatively coupled to said water inlet neck, said upstanding neck and water inlet neck being of substantially lesser diameter than the impeller for inlet of water centrally thereof, a prime mover provided with a drive shaft operatively joined to said hub, a venturi-type fitting constituting an adapter and having one end communicatively connected to the aforementioned peripheral discharge neck and provided with an aerated water discharging nipple at its other end, said adapter fitting having an open-ended passage with a median venturi restriction provided with a coordinating air inlet orifice, and atmospheric air filtering water aerating means having an air delivering tube communicatively joined with said air inlet orifice, whereby air descending said tube is picked up, entrained and mixed with the pressurized stream of water after discharge from the pump and prior to being discharged by way of said nipple, said base unit embodying a hollow conical shell having a connector-neck telescopingly joined to said water inlet neck, said shell provided with a depending externally threaded rim, an annulus provided with an internally screw-threaded upstanding rim screwed to said depending rim and having a bottom surface provided with supporting feet, said annulus provided with a screen supporting and operatively positioning said filtering media, the latter comprising a porous pad aligned with, seated atop, and supported by said screen, said shell being of substantially the same diameter as the pump housing and having a vertical dimension only slightly greater than the vertical dimension of the pump, said centrifugal pump comprising a cup-like rim-equipped receiver section in which said impeller is rotatably but removably seated and housed and a cover section removably covering the receptacle portion of said receiver section, said cover section having a central upstanding bearing lined with a complemental bushing, that portion of the drive shaft which is coordinated with said hub being journaled for rotation in said bushing, and wherein said prime mover comprises an electric motor having a casing provided with an outstanding bottom flange, a vertically elongated sleeve wholly surrounding and protectively enclosing said shaft, said sleeve interposed between said motor casing and pump housing and having an upper end provided with a first flange cooperatively abutting and fastened to said bottom flange, and a second flange resting atop cover section and separably secured thereto, said delivering tube being vertically elongated and of predetermined height and having an upper end provided with a screen-enclosed atmospheric air intake filter, and a supporting clamp supporting said tube from the sleeve and in parallel relation thereto.

* * * * *